(12) United States Patent
Moran

(10) Patent No.: US 7,523,910 B2
(45) Date of Patent: Apr. 28, 2009

(54) DEVICE AND METHOD FOR THE SUSPENSION OF OBJECTS

(76) Inventor: Sean Thomas Moran, 61671 Wriston Springs Rd., Coos Bay, OR (US) 97420

( * ) Notice: Subject to any disclaimer, the term of this patent is extended or adjusted under 35 U.S.C. 154(b) by 111 days.

(21) Appl. No.: 11/423,139

(22) Filed: Jun. 8, 2006

(65) Prior Publication Data

US 2007/0284498 A1    Dec. 13, 2007

(51) Int. Cl.
*A47H 1/10* (2006.01)
(52) U.S. Cl. .......................... 248/317; 24/298; 248/339; 248/685; 248/693
(58) Field of Classification Search ................. 248/317, 248/318, 327, 328, 339, 684, 685, 693; 24/298, 24/302
See application file for complete search history.

(56) References Cited

U.S. PATENT DOCUMENTS

| 5,292,228 | A | * | 3/1994 | Dye | 416/5 |
| 5,360,193 | A | * | 11/1994 | Cobb | 248/318 |
| 5,845,454 | A | * | 12/1998 | Malizia | 52/713 |
| 6,799,917 | B1 | * | 10/2004 | Sampson | 401/88 |
| 7,213,938 | B2 | * | 5/2007 | Brondt et al. | 362/225 |
| 2004/0113035 | A1 | * | 6/2004 | Gary | 248/317 |
| 2007/0170334 | A1 | * | 7/2007 | Ambrose | 248/317 |

* cited by examiner

*Primary Examiner*—Ramon O Ramirez

(57) ABSTRACT

An apparatus for the suspension of objects from stable and overhanging locations. A method for the installation and use of such an apparatus is also included. Apparatus is especially useful in the decorative display of lanterns created from pumpkins and other gourds and melons including cantaloupe, honeydew and watermelon.

22 Claims, 7 Drawing Sheets

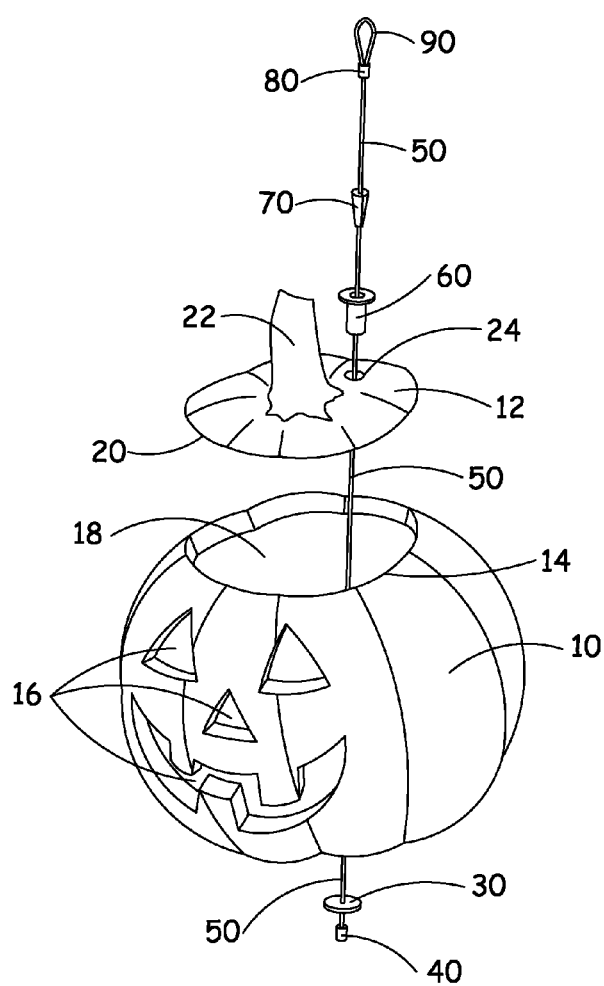
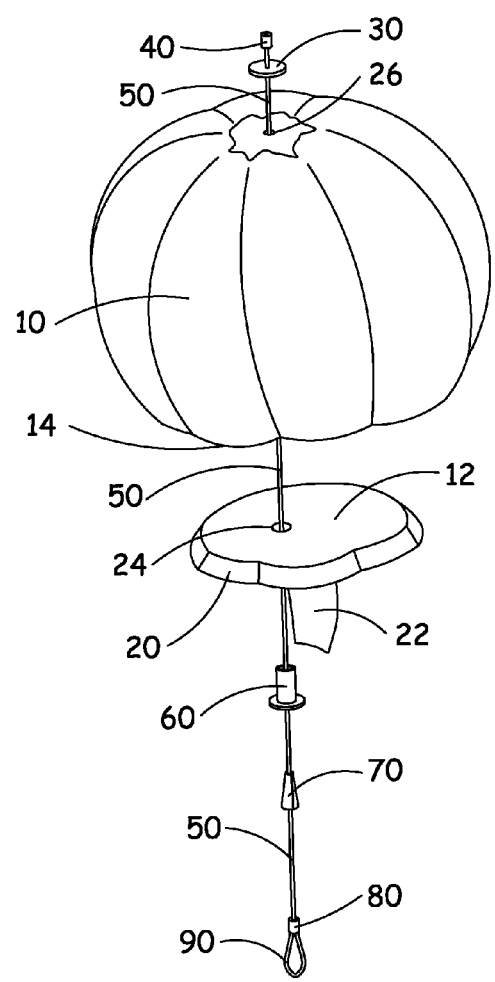

FIG. 7
FIG. 7A
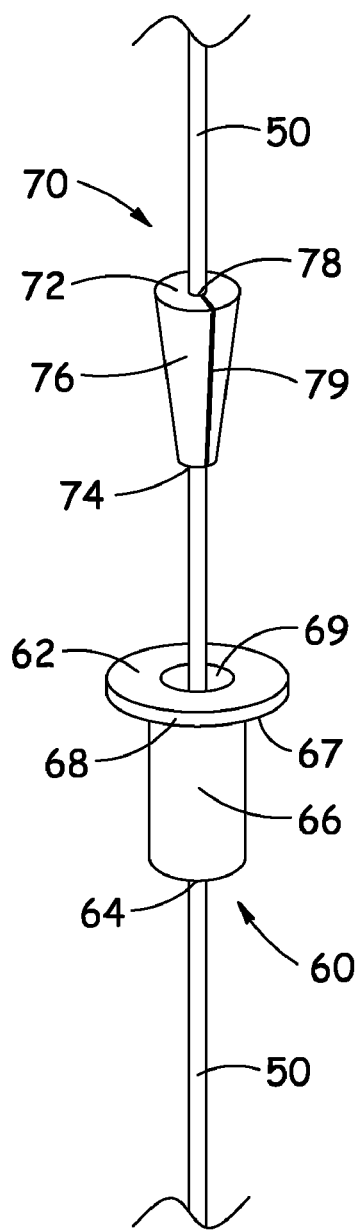
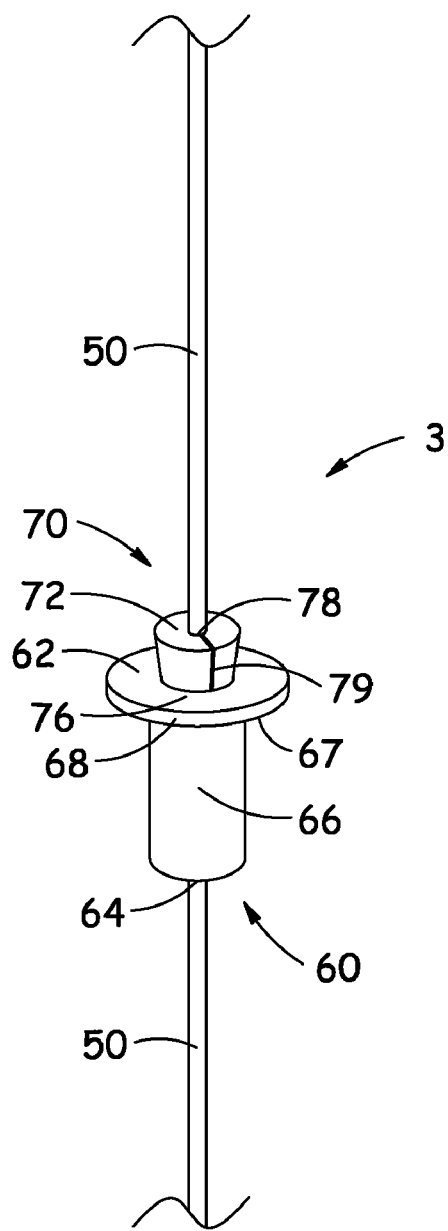

FIG. 9
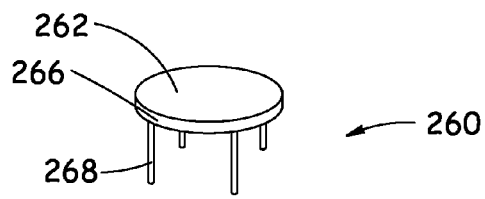
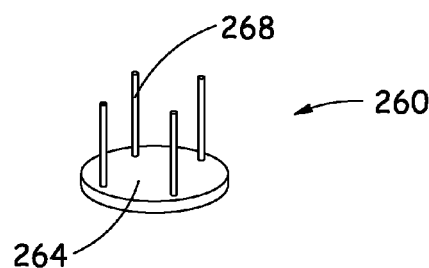
FIG. 9A
FIG. 10
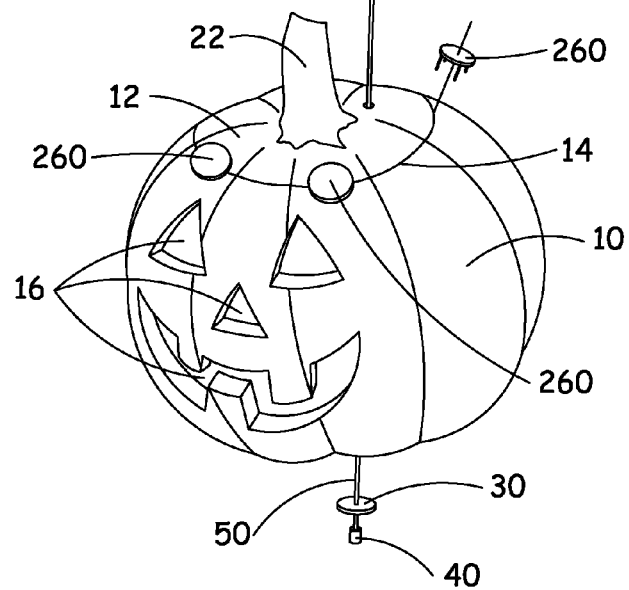

DEVICE AND METHOD FOR THE SUSPENSION OF OBJECTS

BACKGROUND OF THE INVENTION

Suspension of objects is necessary for a multitude of display and utility purposes. Examples include, but are not limited to common houseplants, wind chimes and bird feeders. The invention subject of this patent is specifically useful for the suspension of carved melon and gourd lanterns.

Jack-o-lanterns have been carved from turnips and gourds for hundreds of years, but the practice did not become popular in North America until the late 1800's. Since that time jack-o-lanterns have become an icon to the fall season and the Halloween holiday.

Jack-o-lanterns are typically placed on ground level surfaces or on raised items or structures such as benches, chairs, tables, and display stands or other surfaces. This is the current state-of-the-art. Much innovation has occurred in the past twenty years in the field of pumpkin carving, but very little innovation has occurred in the field of jack-o-lantern display technologies. Display of jack-o-lantern art is currently limited to solid and stable locations where they must be set down. No currently marketed technologies enable a user to suspend jack-o-lanterns.

Current methods for the display of jack-o-lantern art limit the type of carvings that may be created. Typically, only one side of the jack-o-lantern may be visible since the carver must choose the best surface for carving. The natural shape of the pumpkin usually dictates which face will be viewable from the ground since this is the current state-of-the-art for jack-o-lantern display.

BRIEF SUMMARY OF THE INVENTION

The primary object of the invention is to allow for the suspension of objects from nearly any stable and overhanging location. These suspended objects include, but are not limited to, pumpkins and other gourds, common houseplants, and melons such as honeydew, cantaloupe and watermelons. Suspension locations include, but are not limited to, structural elements such as overhanging roof structures, gables, walkways, trees, playground equipment, plant hangers, thresholds and ceilings.

It is another object of the invention to be easily installed by following the provided methods, whereby favorable and robust displaying and performance is possible. Display performance requires the constraint of the carved gourd or melon in a stable and upright position and enables the user to face a carved gourd or melon in any direction desired. The provided method requires only the use of hands and simple common tools.

It is a further object of the invention to allow the user to easily and quickly move the displayed object to different locations.

Additional object of the invention is to have attributes including lightweight, strong, fire proof and condensable for packaging and storage.

The current invention is a lightweight, strong, fire proof and condensable suspension apparatus provided for the display of objects, such as a jack-o-lantern, through suspension from any stable and overhanging location. The suspension apparatus is comprised of a tensile member, support plate and connection element. The support plate is comprised of a strong material designed to withstand the loading resulting from said object suspension. The support plate transfers the suspension loads to the tensile member. Suspension loads are defined as loads that must be supported by the invention during normal operation. These loads include, but are not limited to, the forces caused by gravity, wind, rain and vibration. The base of the object effectively rests on the support plate. The tensile member is comprised of a strong, fireproof material that is connected on one end to the support plate and on the other end to the connection element. The tensile member may be embodied in many forms including, but not limited to, metallic, plastic or elastomeric rods, cables or ropes. The tensile member is installed through the bottom of the object, approximately through the center of the object and out of the highest surface. The tensile member transfers the suspension loads to the connection element. The connection element is comprised of a strong material having a form that allows for the distribution of all reaction loads resulting from suspension loads to an anchoring point. The anchoring device may be embodied in many forms including, but not limited to, screws, bolts, hooks, eyelets, openings and extended bodies such as tree branches, bars or lumber. The securing element may also be embodied in many forms including, but not limited to, hooks, loops, eyelets or other connectors. When the configuration for a desired suspension location is not compatible with the previously described connections and anchor devices, then another device may used to create an anchoring device. Examples include, but are not limited to, pipe clamps, zipping cable ties, rope, wire rope and cables.

The physical connections made between the tensile member, connection element and support plate may be made through a variety of methods, which are standard to industry. These methods include, but are not limited to, welding, brazing, clamping or the application of cable compression fittings. Cable compression fittings are devices that are forged around bare wire rope ends to terminate these wire rope ends, or to create closed loops. During compression, the ductile compression fittings are forced into free spaces to cause a residual pressure that significantly increased relative friction between the wire rope and the compression fitting. Physical deformation of said parts also creates resistance to failure through interference, which utilizes the shear strength of said materials.

Preferably, the support plate, tensile member and connection element are constructed to form an assembly for ease of packaging and use. The preferred embodiment for the tensile member is in the form of a strong, fireproof, flexible, corrosion-resistant metallic cable. These properties and materials are chosen for reasons including safety, cost savings, proximity to flame in a jack-o-lantern, ability to package and store, strength and the capability to use standard industrial tooling and parts.

With the preferred embodiment additional functional elements may, or may not, be required for stability and performance, when applied to carved gourds and melons. With a cable extending through the top lid of the carved gourd or melon, loading causes an unstable equilibrium. If a destabilizing force acts on the device, the lid may become dislodged and the display properties become unfavorable through object tilting. In this preferred embodiment, a lid-locking device is required. The lid-locking device may be embodied in many forms. It may be embodied in the form of anchors embedded into the pumpkin on either side of the seam of the cut lid in multiple locations holding the lid in place by resisting lateral destabilizing loads. It may also be embodied in the form a device that locks an object on the cable at the desired location forcing the lid tightly into its equilibrium position.

The functions, claims and relevance of the present invention to the current state-of-the-art will be defined in greater detail in the following detailed description of the preferred embodiment in conjunction with the provided drawings.

BRIEF DESCRIPTION OF THE SEVERAL VIEWS OF THE DRAWING

FIG. 2 is an exploded perspective view from above of the preferred embodiment configuration of the present invention as installed specifically into a jack-o-lantern.

FIG. 3 is an exploded perspective view from below of the preferred embodiment configuration of the present invention as installed specifically into a jack-o-lantern.

FIG. 7 is a magnified perspective view of the lid-locking device for the preferred embodiment of the present invention prior to placement in secured position.

FIG. 7A is a magnified perspective view of the lid-locking device for the preferred embodiment of the present invention in secured position.

FIG. 9 is a magnified perspective view from above of an alternative embodiment of the lid-locking device for the preferred embodiment of the present invention showing four said multiple extrusions.

FIG. 9A is a magnified perspective view from below of an alternative embodiment of the lid-locking device for the preferred embodiment of the present invention showing four said multiple extrusions.

FIG. 10 is an exploded perspective view of a second alternative embodiment of said suspension apparatus similar in form and function to the preferred embodiment with an alternative lid-locking device as installed specifically into a jack-o-lantern.

DETAILED DESCRIPTION OF THE INVENTION

Figure 1:
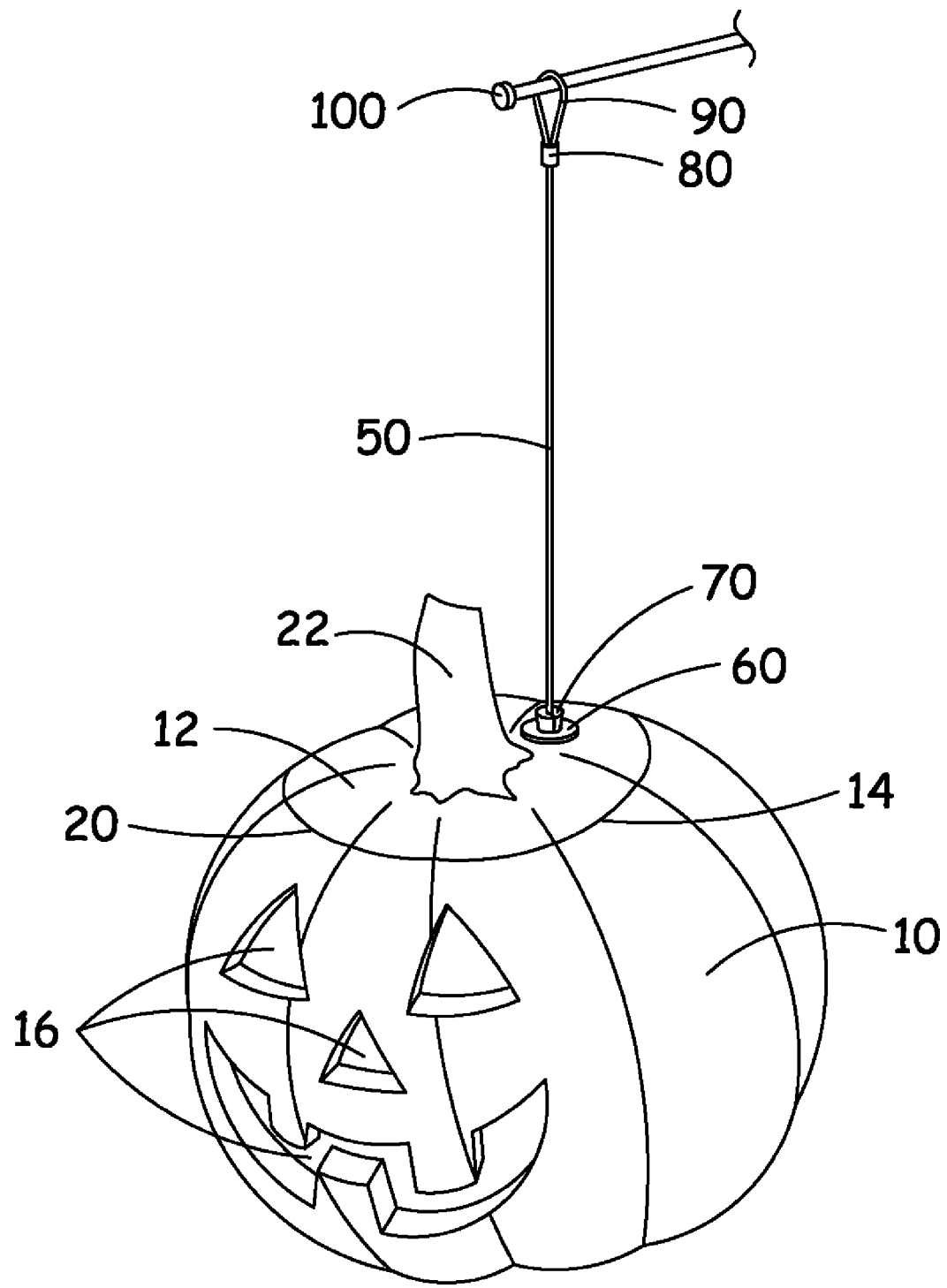
FIG. 1 is a perspective view of the preferred embodiment configuration of the present invention as installed specifically into a jack-o-lantern and placed in suspension from an anchoring device, which in this particular figure is a bolt, screw or nail.
Figure 5:
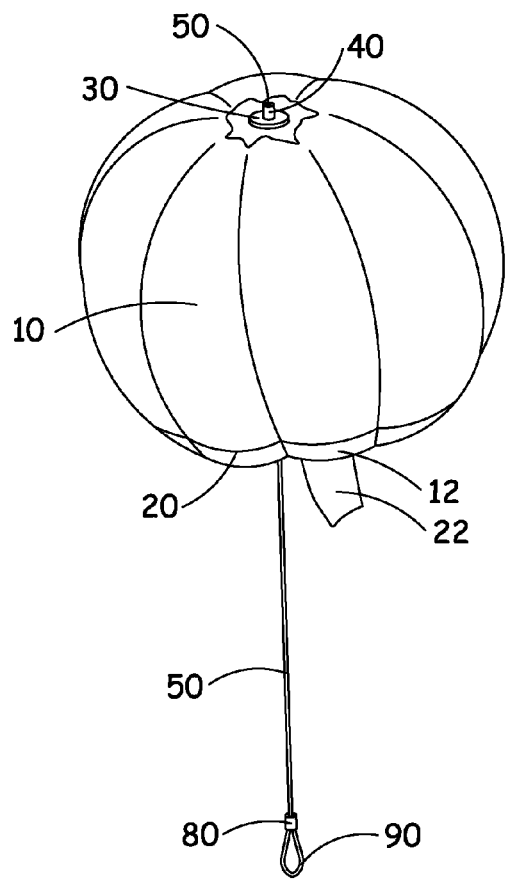
FIG. 5 is a perspective view from below of the preferred embodiment configuration of the present invention as installed specifically into a jack-o-lantern.
Figure 4:
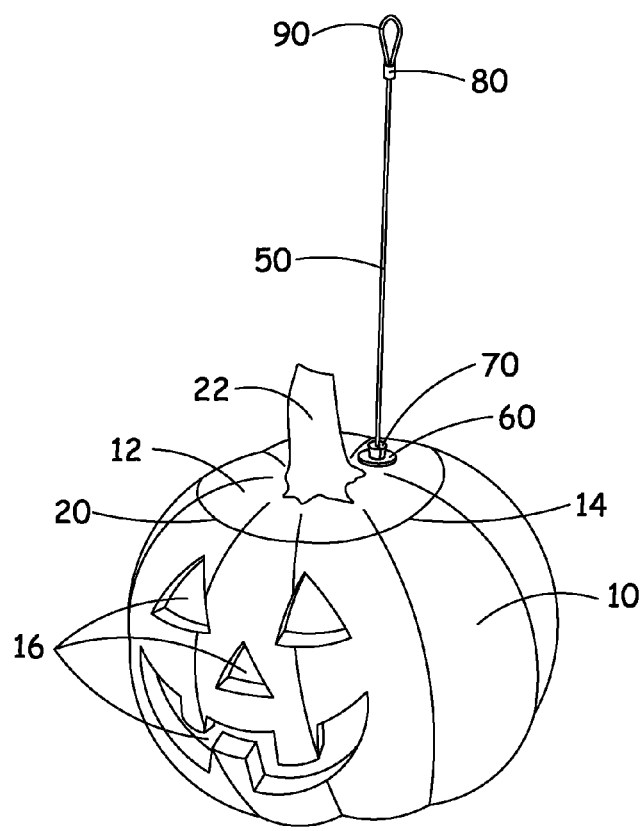
FIG. 4 is a perspective view from above of the preferred embodiment configuration of the present invention as installed specifically into a jack-o-lantern.
Figure 6:
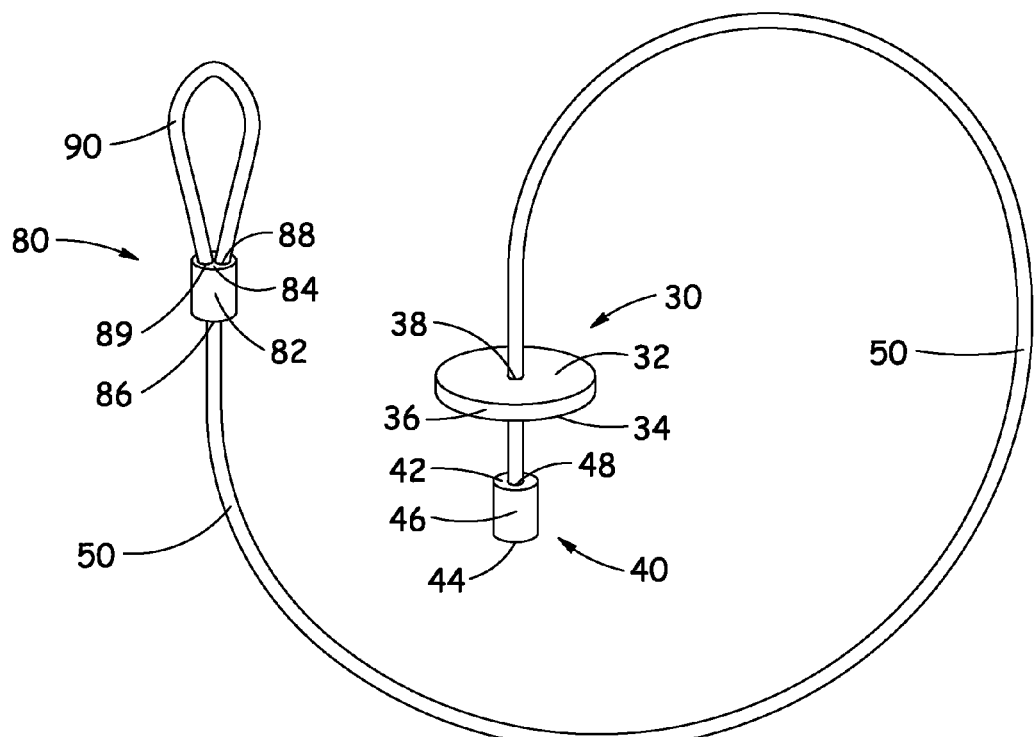
FIG. 6 is a magnified perspective view of the preferred embodiment configuration of the present invention.

The present invention relates to an apparatus adapted for the suspension of objects from nearly any stable and overhanging location. The invention is especially useful in the suspension of objects including, but are not limited to, pumpkins and other gourds, and melons such as honeydew, cantaloupe and watermelons. The invention is installed by inserting said apparatus through the lowest surface of said object beginning with the securing element, pulling said apparatus through the approximate center of said object and extracting said apparatus from the top surface of said object, where it continues upward to a suspension anchoring location. Suspension anchoring locations include, but are not limited to, structural elements such as structural overhanging roofs, gables and walkways, trees, playground equipment, plant hangers, thresholds and ceilings. Thus, as shown in FIG. 1, jack-o-lantern 10 is in a state of suspension though the application of the present invention in the form of a suspension apparatus 1. Suspension apparatus 1, as shown in FIG. 6 includes a suspension assembly 2 and lid-locking assembly 3. The lid-locking assembly 3, as shown in FIG. 7, consists of a lid-locking base 60 and lid-locking compression element 70. The suspension assembly 2 consists of a tensile member 50 with a loop 90 on one end created with a loop creation device 80, an end-stopping device 40 on the opposite end and a support plate 30. The suspension assembly 2 is assembled first by installing the end-stopping device 40, then passing the opposite bare end of the tensile member 50 through the hole in the support plate 30 and finally creating the loop 90 with the loop creation device 80 containing the support plate between the two ends of the suspension assembly 2.

As shown in FIG. 2, FIG. 3, FIG. 4 and FIG. 5, then, suspension assembly 2, beginning with the loop 90, is inserted through the bottom surface of the jack-o-lantern 10, continuing through the approximate center of the jack-o-lantern 10 and exiting through the top of lid 12 at a location that is as close to the axis and stem 22 of the jack-o-lantern 10 as possible and continuing upward where the loop 90 is secured to the anchoring device 100, as shown in FIG. 1. Upon suspension, the weight of the jack-o-lantern 10 will force it to come to rest upon the support plate 30. The loop 90 and loop creation device 80 are passed through the center hole 69 of the lid-locking base 60, which is then translated downward along the tensile member 50, relative to loop 90, until is comes into contact with the lid 12, where it is forced into the flesh of the lid 12 until its surface 67 comes into contact with the surface of the lid 12. The lid-locking compression element 70 is forced to encapsulate the tensile member 50 in its axial hole 78 located along its axis B by inserting said tensile member 50 through a radial extending slit 79 along its length as illustrated in FIG. 7. The lid-locking compression element 70 is then forced into the axial hole 69 of said lid-locking base 60, located along its axis A. The compression forces imparted between the lid-locking base 60, the lid-locking compression element 70 and the tensile member 50 increase the relative friction forces between these elements preventing the lid 12 from becoming dislodged from said object 10 by suspension loads.

The structure of the suspension apparatus 1 is shown is greater detail is FIG. 6. It may be appreciated that the suspension assembly 2 may function to enable the suspension of said objects without the aid of any other devices, but the lid-locking assembly 3 improves the performance of the present invention by maintaining the stability of the suspended object regardless of suspension loading.

The suspension assembly 2, as shown in FIG. 6, consists of a tensile member 50 with a loop 90 on one end created with a loop creation device 80, an end-stopping device 40 on the opposite end and a support plate 30. The tensile member 50 consists of a thin and elongated form capable of extending through said suspended object. The loop 90 consists of a section of the tensile member formed back and reconnected adjacent to itself at a specific location, which enables the loop 90 to connect to the said anchoring device 100. The reconnection location is arbitrary, but must accommodate the intended anchoring device 100. The loop 90 is created with the loop creation device 80, which consists of a cylinder-like form with two parallel end surfaces 84 and 86, a cylindrical surface 82, and two cylindrical holes 88 and 89, which extend entirely through the device between said end surfaces 84 and 86. The tensile member 50 is inserted through one of the said holes 88, returned through the other hole 89 to create the loop 90 and secured to the loop creation device. The end-stopping device 40 consists of a cylinder-like form with two parallel end surfaces 42 and 44, a cylindrical surface 46, and one cylindrical hole 48, which extends entirely through the device between said end surfaces 42 and 44. The tensile member 50 is inserted through said hole 48 and secured to the end-stopping device 40. The support plate 30 consists of a plate-like form with two parallel end surfaces 32 and 34, a boundary surface 36, which is perpendicular and intersecting with the said end surfaces 32 and 34 and a cylindrical hole 38, which extends entirely through the device between said end surfaces 32 and 34. The tensile member 50 is inserted through said hole 38 allowing the support plate 30 to rest upon the secured end-stopping device 40 for the purpose of supporting the said suspended object.

The lid-locking assembly 3, as shown in FIG. 6, consists of a lid-locking base 60 and lid-locking compression element 70. The lid-locking base 60 consist of a flanged, cylindrical form with axis A, parallel end surfaces 62 and 64, an opposing surface parallel to end surface 62, a cylindrical surface 68 perpendicular and intersecting parallel surfaces 62 and 67, a cylindrical surface 66 perpendicular and intersecting parallel surfaces 64 and 67 and a cylindrical hole 69, which extends entirely through the device between said end surfaces 62 and 64. The suspension assembly 2 is inserted through the said cylindrical hole 69 when installed as shown in FIG. 1, FIG. 2 and FIG. 3. The lid-locking base 60 is pressed into the lid of the jack-o-lantern 12. The lid-locking compression element 70 consists of a plug-shaped form with axis B, two parallel end surfaces 72 and 74 of dissimilar sizes connected with a transverse conical-section surface 76 intersecting with said end surfaces 72 and 74 to create a transverse conical section, a cylindrical hole 78, which extends entirely through the device between said end surfaces 72 and 74 and a full-length radially-extending slit 79 described by a cutting plane that intersects with said axis B cutting away from said axis in only one direction. The tensile member 50 is encompassed by the cylindrical hole 78 of the said device 70 by means of the said full-length radially extending slit 79. During installation, the lid-locking compression element 70 is translated downward along tensile member 50 and forced into the cylindrical hole 69 of the lid-locking base 60 as shown in FIG. 7 and FIG. 7A. This action imparts residual compression forces between the tensile member 50, lid-locking base 60 and lid-locking compression element 70 increasing the relative friction forces between the said elements 50, 60 and 70, which effectively increasing the forces required to dislodge the lid 12 from said object body 10.

The present suspension apparatus 1 is adapted to operate without degradation or failure is a harsh chemical and physical outdoor environments including ultraviolet radiation, open flame, heat, cold, wet and dry weather. The ideal materials for the present invention include corrosion resistant metals and flexible and stiff plastics. The present invention is inexpensive to manufacture and is easily configured to be contained in relatively small packaging. The present invention is easily cleaned and is reusable. The tensile member 50 is fabricated of a strong, flameproof, ductile, washable and corrosion resistant material, examples of which include wire rope, braided metallic cable or solid ductile metallic wire, which are widely available. The support plate 30 is fabricated of a strong, stiff, ductile, washable and corrosion resistant materials, examples of which include metals and hard plastics, which are widely available. The support plate 30 may be manufactured through various methods including stamping, forging or injection molding. The end-stopping device 40 is fabricated of strong, stiff, ductile, washable and corrosion resistant materials, examples of which include metals and hard plastics. A specific example of a widely available device, which may be used for the end-stopping device 40 is a wire rope compression fitting. The end-stopping device 40 may also be embodied in the form of a welded, brazed, soldered or forged mass fused, potentially with epoxy or glue, to the tensile member 50 in the appropriate location. The end-stopping device 40 may be manufactured through various methods including stamping, forging, extrusion or molding. The loop creation device 80 is fabricated of strong, stiff, ductile, washable and corrosion resistant materials, examples of which include metals and hard plastics. A specific example of a widely available device, which may be used for the loop creation device 80 is a wire rope compression fitting. The loop creation device 80 may also be embodied in the form of a welded, brazed, soldered or forged mass fused, potentially with epoxy or glue, to the tensile member 50 in the appropriate location. The loop creation device 80 may be manufactured through various methods including stamping, forging, extrusion or molding. The lid-locking base 60 is fabricated of strong, stiff, ductile, washable and corrosion resistant materials examples of which include metals and hard plastics. The lid-locking base 60 may be manufactured through various methods including stamping, forging or injection molding. The lid-locking compression element 70 is fabricated of tough, flexible, elastic, washable and corrosion resistant materials with relatively high values for coefficients of static friction, examples of which include rubbers and soft or flexible plastics. The lid-locking compression element 70 may be manufactured through various methods including forging or molding. The anchoring device 100 is fabricated of strong, stiff, ductile, washable and corrosion resistant materials, examples of which include metals and hard plastics. The anchoring device 100 may be manufactured through various methods including stamping, forging, extrusion or molding. The anchoring device 100 has a relatively arbitrary form, which must have a secure connection to said stable and overhanging location and bearing surface that will accept form of said loop 90. The anchoring device 100 may be embodied in many forms including, but not limited to, screws, bolts, hooks, eyelets, holes in materials, structural edges and extended bodies such as tree branches, bars or lumber. Anchoring device may also be fabricated with alternative forms including, but are not limited to, pipe clamps, zipping cable ties, rope, wire rope and cables.

The functional elements of suspension apparatus 1 function together in the said operating environment, while maintaining the stable and secure suspension of said object 10 from stable and overhanging locations. Said suspension loads acting on the said suspended object 10 are directly transferred in the form of a distributed load from said object 10 to the support plate 30 acting normally on said end surface 32 and perpendicular to tensile member 50 along its length where is passes through said lid 12. Said suspension loads are then transferred from the end surface 34 of the support plate 30 to end-stopping device 40 in the form of a distributed load acting normally on the end surface 42. Said suspension loads are then transferred from the end-stopping device 40 to the tensile member 50 in the form of frictional or shear loads acting parallel to the axis of the tensile member 50. Said suspension loads are then transferred along the tensile member 50 and into the loop creation device 80 in the form of frictional or shear loads acting parallel to the axis of the tensile member 50. Said suspension loads are then transferred from the loop creation device 80 into the loop 90 in the form of frictional or shear loads acting parallel to the loop as it enters the plane of the end surface 84 of the loop creation device 80. Said suspension loads are then transferred from the loop 90 to the anchoring device 100 in the form of distributed loads acting normally to the surface of interaction between the loop 90 and the anchoring device 100. Said suspension loads are then transferred from the anchoring device 100 to the said stable and overhanging location as reaction loads, which vary depending upon the type of device used for the anchoring device 100. Said suspension loads may act to destabilize the seated position of the lid 12, on said object 10, which upon unseating creates an overall instability in the position of the said object 10 resulting in a new resting orientation of the said object 10 that is unfavorable as compared to the desired display orientation. The lid-locking assembly 3, as shown in FIG. 7, is introduced to reduce the probability of the said potential destabilizing event. The lid-locking base 60 is forced through surface of the lid 12 until is becomes securely lodged into the flesh of the lid 12 per the said installation procedure. The lid-locking compression element 70 is placed over the tensile member and forced into the lid-locking base 60 per the said installation procedure and as illustrated in FIG. 7. When said destabilizing suspension loads are present the loads may cause loading transverse to the axis of the tensile member to be imparted into lid-locking compression element 70. As the lid-locking compression element 70 is forced into the lid-locking base 60 compression forces are imparted between the lid-locking base 60, the lid-locking compression element 70 and the tensile member 50 increasing the relative friction forces between these elements preventing the lid 12 from becoming dislodged by destabilizing suspension loads, thereby maintaining the desired display orientation of the said object during suspension.

Figure 8:
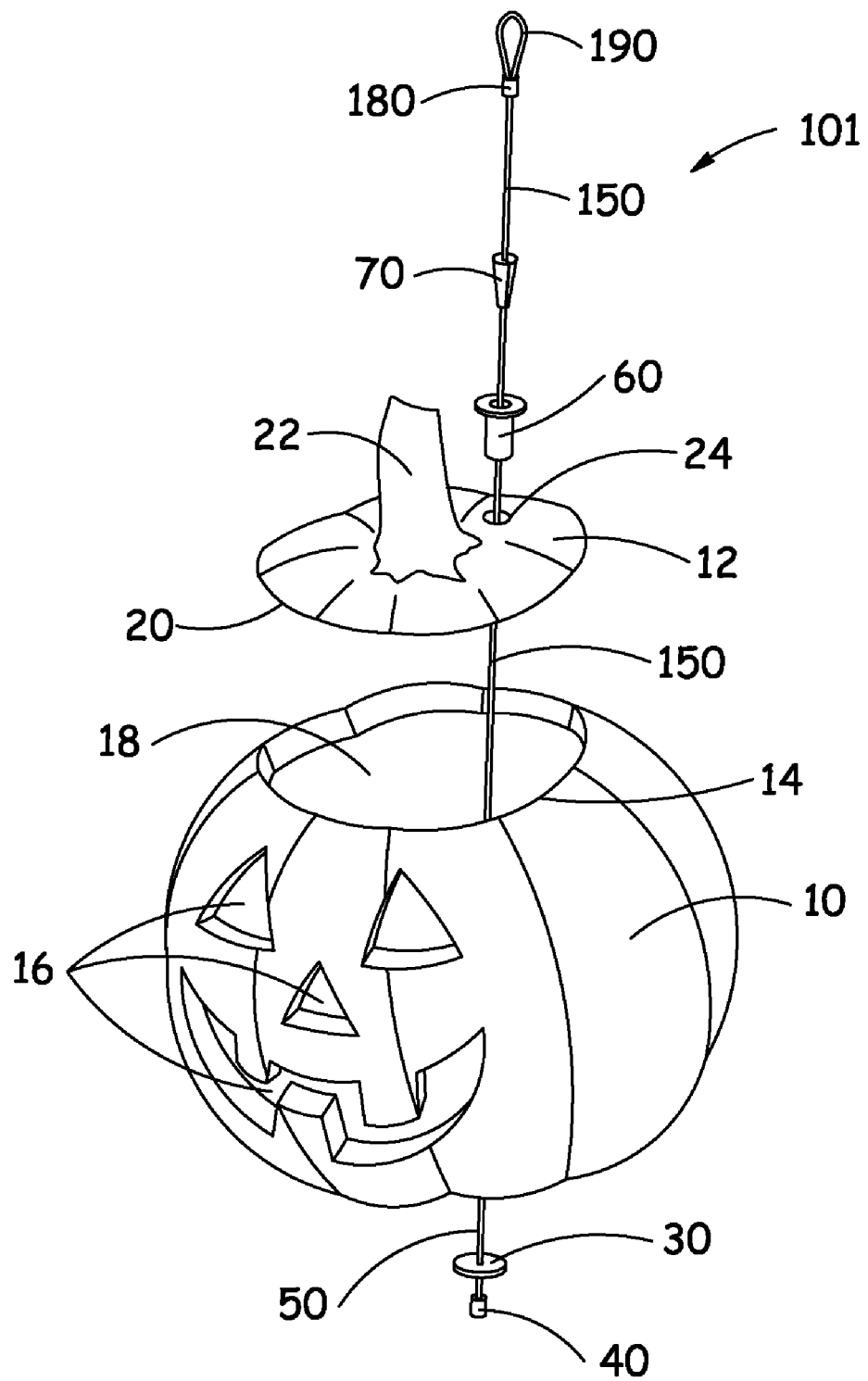
FIG. 8 is a perspective view of a first alternative embodiment of said suspension apparatus similar in form and function to the preferred embodiment with the tensile member having rigid body properties.

A first alternative embodiment of a suspension apparatus 101 is shown is FIG. 8 and is very similar in form and function to the suspension apparatus 1 shown in FIG. 1 through FIG. 7. However, the tensile member 50 in suspension apparatus 1 is reformed as a rigid tensile member 150. The end-stopping device 40, support plate 30, lid-locking base 60 and lid-locking compression element 70 are unchanged in form and function in this first alternative embodiment. The loop creation device 180 is identical and form and function as the loop creation device 80 with the additional potential form of threaded fastening to the tensile member 150 and the loop 190. The loop 190 is identical in form and function as the loop 90 with the additional potential forms of currently available hooking-type devices including eyelets and hooks that may be threaded into the loop creation device 180.

A second alternative embodiment of a suspension apparatus 201 is shown is FIG. 9, FIG. 9A and FIG. 10. and is very similar in form and function to the suspension apparatus 1 shown in FIG. 1 through FIG. 7. However, the said lid-locking assembly 3 in said suspension apparatus 1 is reformed as a physical alternative to the lid-locking assembly 3 as a multitude of lid-locks 260. The end-stopping device 40, support plate 30, tensile member 50, loop creation device 80 and loop 90 are unchanged in form and function in this second alternative embodiment. The lid-lock 260 consists of a plate-like element with two parallel end surfaces 262 and 264 separated by a perpendicular surface 266 that intersects the said parallel end surfaces 262 and 264 and multiple anchor posts 268 that are fused to the said end surface 264. The lid-lock 260 is installed as shown in said FIG. 10 by pressing the multiple anchor posts into the flesh of the jack-o-lantern 10 with anchor posts 268 being pressed into the jack-o-lantern flesh on either side of the lid rim 20 and the jack-o-lantern body rim 14. The lid-lock 260 restrains the lid 12 from being dislodged from the jack-o-lantern body 10 in the event that destabilizing suspension loads act on the said suspended object 10. The lid-lock 260 is fabricated of materials that are washable, stiff and corrosion resistant. The preferred material for fabrication of the lid-lock 260 is plastic manufactured by injected molding techniques.

The present invention has been described in detail specific to the preferred embodiments. The following claims allow for modifications and changes to the preferred embodiments of the present invention.

What is claimed is:

1. An apparatus for the suspension of an object from stable and overhanging locations where said object has an enclosed volumetric form, and outer shell of varying thickness and a temporarily removed volumetric section allowing access to the interior volume of said object, comprising:
    a. an object supporting element composed of two separate elements including an end-stopping element having means of connection to lowest end of a tensile member and a supporting element having an internal through hole that allows said tensile member to pass through it and rests upon top surface of said end-stopping element during said object suspension, which supports said object during said object suspension;
    b. said tensile member having an elongated form having thin width as compared to it length that is adapted to be installed entirely through said object and passing through the approximate center of said object, which transfers forces introduced to said apparatus during said object suspension to a securing element;
    c. said securing element having means of connection to the highest end of said tensile member and means of securing to an anchoring device, which transfers forces introduced to said suspension apparatus during said object suspension to said anchoring device through load bearing contact;
    d. said anchoring device having means of connection to said stable and overhanging location, which supports said suspension apparatus during said object suspension.

2. The suspension apparatus of claim 1 including an chemical bonding material for securing the position of said temporarily removed section relative to said object's main body through the application of said chemical bonding material that may be applied to, and adjacent to, the boundaries between said temporarily removed section and said object's main body.

3. The suspension apparatus of claim 1 wherein the functions of said securing element and said anchoring device are combined into one functional element connected to the highest end of said tensile member with means of connection to said stable and overhanging locations.

4. The suspension apparatus of claim 1 wherein said securing element is composed of a closed-loop form allowing said suspension apparatus to be secured to said anchoring device after passing said anchoring device through said closed loop form of said securing element.

5. The suspension apparatus of claim 1 wherein said securing element is composed of an open-loop form, allowing said suspension apparatus to be secured to said anchoring device after passing said anchoring device through the discontinuity in said open loop form of said securing element.

6. The suspension apparatus of claim 1 wherein said securing element is formed from material belonging to said tensile member near the end of said tensile member.

7. The suspension apparatus of claim 1 including a device for securing the position of said temporarily removed section relative to said object's main body with a location retention device with means of connecting to said tensile member near the location defined by the intersection of the outer surface of said temporarily removed section and where said tensile member exits said temporarily removed section, and through physical contact prevents said temporarily removed section from deviation from said relative position.

8. The suspension apparatus of claim 1 including a device for securing the position of said temporarily removed section relative to said object's main body with a location retention device with a clamping mechanism, which semi-permanently clamps to said tensile member at the location defined by the intersection of the outer surface of said temporarily removed section and where said tensile member exits said temporarily removed section, and through physical contact prevents said temporarily removed section from deviation from said relative position.

9. The suspension apparatus of claim 1 including a device for securing the position of said temporarily removed section relative to said object's main body with a rigid base element that is anchored into surface of said temporarily removed section having an internal opening through its entirety that accepts an elastic compression element having a tapered form and an internal opening through its entirety that accepts said tensile member through its entirety and upon compression of said compression element into said base element maintains a residual pressure between said base element, said compression element and said tensile member thereby increasing relative friction between said elements, thus preventing deviation of said temporarily removed section from said relative position.

10. The suspension apparatus of claim 1 including a multitude of identical devices for securing the position of said temporarily removed section relative to said object's main body having a plate-like form with a multitude of extrusions extending from one side of said plate-like form that are anchored into the material of said object on opposite sides of boundary line between said object's said temporarily removed section and said object body at varying locations along said boundary, thus preventing deviation of said temporarily removed section from said relative position.

11. The suspension apparatus of claim 1 including a formable material for securing the position of said temporarily removed section relative to said object's main body through the application of said formable material that may be applied to, and adjacent to, the boundaries between said temporarily removed section and said object's main body, thus preventing deviation of said temporarily removed section from said relative position.

12. A method for the suspension of an object from stable and overhanging locations, comprising:
   a. providing said object having an enclosed volumetric form, an outer shell of varying thickness and a volumetric section temporarily removed allowing access to the interior volume of said object;
   b. providing a suspension apparatus comprising an object supporting element, tensile member, securing element and anchoring device;
      i. an object supporting element composed of two separate elements including an end-stopping element having means of connection to lowest end of a tensile member and a supporting element having an internal through hole that allows said tensile member to pass through it and rests upon top surface of said end-stopping element during said object suspension, which supports said object during said object suspension;
      ii. said tensile member having an elongated form having thin width as compared to it length that is adapted to be installed entirely through said object and passing through the approximate center of said object, which transfers forces introduced to said apparatus during said object suspension to a securing element;
      iii. said securing element having means of connection to the highest end of said tensile member and means of securing to an anchoring device, which transfers forces introduced to said suspension apparatus during said object suspension to said anchoring device through load bearing contact;
      iv. said anchoring device having means of connection to said stable and overhanging location, which supports said suspension apparatus during said object suspension.
   c. Securing said anchoring device to said stable and overhanging location;
   d. inserting said securing element of said suspension apparatus through bottom of said object near the location where the imaginary vertical line that passes through said object's center of gravity passes through bottom of said object;
   e. extending said securing element of said suspension apparatus through the approximate center of said object;
   f. extracting said securing element of said suspension apparatus from the top of said object near the location where the imaginary vertical line that passes through said object's center of gravity passes through top of said object;
   g. securing said securing element to said anchoring device; and
   h. allowing said object to translate downward along said tensile member relative to said anchoring device until constrained by said supporting element.

13. The method of claim 12 wherein the functions of said securing element and said anchoring device are combined into one functional element connected to the highest end of said tensile member with means of connection to said stable and overhanging locations and said step (h) is excluded.

14. The method of claim 13 including a device for securing the position of said temporarily removed section relative to said object's main body with a location retention device with means of connecting to said tensile member near the location defined by the intersection of the outer surface of said temporarily removed section and where said tensile member exits said temporarily removed section, and through physical contact prevents said temporarily removed section from deviation from said relative position and is installed after said step (h).

15. The method of claim 12 wherein said securing element is composed of a closed loop form allowing said suspension apparatus to be secured to said anchoring device after passing said anchoring device through said closed loop form of said securing element.

16. The method of claim 12 wherein said securing element is composed of an open loop form allowing said suspension apparatus to be secured to said anchoring device after passing said anchoring device through the discontinuity in said open loop form of said securing element.

17. The method of claim 12 wherein said securing element is formed from material belonging to said tensile member near the end of said tensile member.

18. The method of claim 12 including an chemical bonding material for securing the position of said temporarily removed section relative to said object's main body through the application of said chemical bonding material that may be applied to, and adjacent to, the boundaries between said temporarily removed section and said object's main body and is installed after said step (h).

19. The method of claim 12 including a device for securing the position of said temporarily removed section relative to said object's main body with a location retention device with a clamping mechanism, which semi-permanently clamps to said tensile member at the location defined by the intersection of the outer surface of said temporarily removed section and where said tensile member exits said temporarily removed section, and through physical contact prevents said temporarily removed section from deviation from said relative position and is installed after said step (h).

20. The method of claim 12 including a device for securing the position of said temporarily removed section relative to said object's main body with a rigid base element that is anchored into surface of said temporarily removed section having an internal opening through its entirety that accepts an elastic compression element having a tapered form and an internal opening through its entirety that accepts said tensile member through its entirety and upon compression of said compression element into said base element maintains a residual pressure between said base element, said compression element and said tensile member thereby increasing relative friction between said elements, thus preventing deviation of said temporarily removed section from said relative position and is installed after said step (h).

21. The method of claim 12 including a multitude of identical devices for securing the position of said temporarily removed section relative to said object's main body having a plate-like form with a multitude of extrusions extending from one side of said plate-like form that are anchored into the material of said object on opposite sides of boundary line between said object's said temporarily removed section and said object body at varying locations along said boundary, thus preventing deviation of said temporarily removed section from said relative position and is installed after said step (h).

22. The method of claim 12 including a formable material for securing the position of said temporarily removed section relative to said object's main body through the application of said formable material that may be applied to, and adjacent to, the boundaries between said temporarily removed section and said object's main body, thus preventing deviation of said temporarily removed section from said relative position and is installed after said step (h).

* * * * *